W. WELLS.
Revolving Horse-Rakes.
No. 137,987.
Patented April 15, 1873.
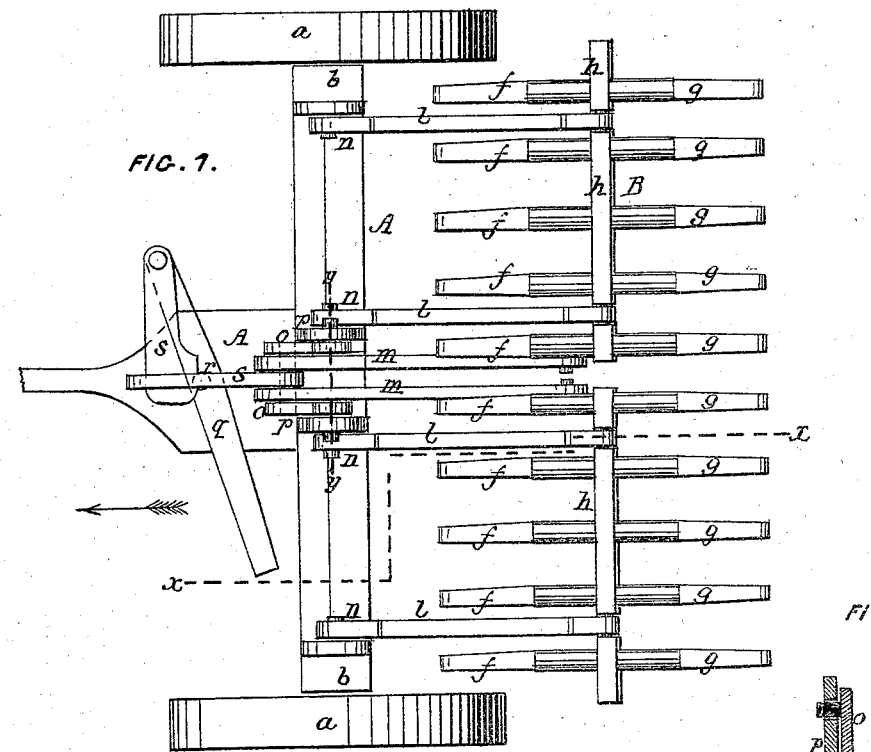
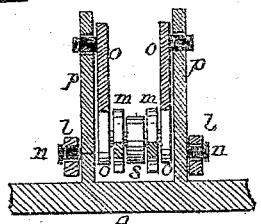
FIG. 3.
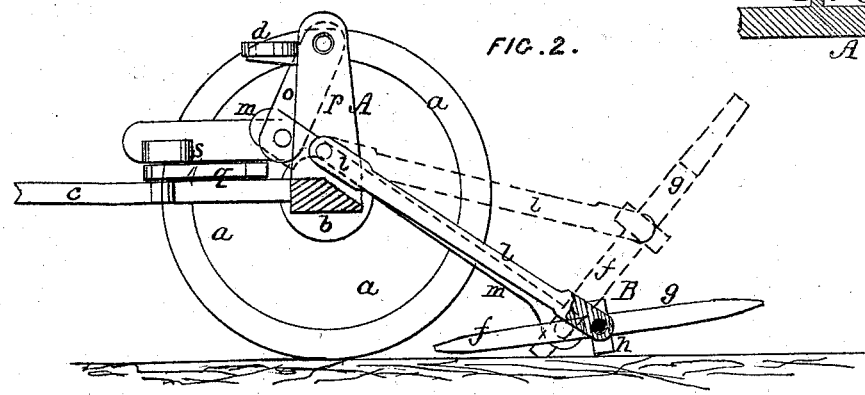
FIG. 2.
WITNESSES.
J. P. McElroy.
C. A. Pease
INVENTOR.
William Wells
per
Brown Brothers
Attorneys

UNITED STATES PATENT OFFICE.

WILLIAM WELLS, OF SALEM, MASSACHUSETTS, ASSIGNOR OF ONE-HALF HIS RIGHT TO ENOCH P. FULLER, OF SAME PLACE.

IMPROVEMENT IN REVOLVING HORSE-RAKES.

Specification forming part of Letters Patent No. 137,987, dated April 15, 1873; application filed January 22, 1873.

*To all whom it may concern:*

Be it known that I, WILLIAM WELLS, of Salem, in the county of Essex and State of Massachusetts, have invented certain new and useful Improvements in Horse-Rakes; and that the following is a full, clear, and exact description of the same, reference being had to the accompanying drawing.

The present invention relates to that class of horse-rakes having a double set of rake-teeth on a common rake-head, arranged to be revolved for discharging hay, &c., from time to time; and the invention consists in suspending the rake-head carrying the teeth from the carriage by rods, and combining therewith rods for operating the rake-teeth, hung to crank-arms and operated by an angular arm and a lever, all as will be fully hereinafter set forth.

In the accompanying plate of drawing my improvement in revolving horse-rakes is illustrated, Figure 1 being a plan view; Fig. 2, a transverse vertical section in plane of line $x\,x$, Fig. 1; and Fig. 3, a detail section in plane of line $y\,y$, Fig. 1.

In the drawing, A represents the carriage or running portion of the horse-rake, $a\,a$ being the two wheels, and $b$ their axle-shaft; $c\,c$, the thills, and $d$ the driver's seat, midway between wheels $a\,a$; B, the raking portion proper, consisting of two sets of rake-teeth, $f$ and $g$, secured to and in a common head or shaft, $h$, from which both sets project equally, one set from one side and the other from the other side of the head, as shown. This rake-head $h$ in the present instance, as to its length, is in two sections. $l$, rods, four in number, with one hung at each end of the two sections, and the whole series hung upon proper and separate bearings or centers $n$ of the carriage A; $m$, two rods. These rods by one end are hung one to one section, and one to the other section of the rake-head $h$ at the center of the machine, and by the other end are hung to a common crank, $o$, that in turn is hung between the standard $p$ of the carriage A upon a center of each standard; $q$, a lever hung upon a fulcrum, $r$, of carriage A, and connected through an angular arm, S, that is hung to it at one end to the crank $o$, hereinbefore referred to.

The lever $q$ is the operating-lever, and assuming it to be in the position shown, by then moving it toward the front of the machine, in the direction indicated by the arrow, the rake-head $h$, through the connection of parts described, will be lifted from the ground, at the same time presenting the points of its inner set $f$ of raking-teeth to the ground, (see Fig. 2, dotted lines,) whereby, through the continued forward movement of the horse-rake together with a continuance of the movement of the lever in the direction stated, the rake-head is revolved, leaving the load of its rake-teeth $f$, and bringing its other set $g$ into position to then rake. When desired to revolve the rake again, move the lever back to its original position, when by its movement the rake-teeth $g$ will be presented to the ground, as before stated for the rake-teeth $f$, and so on. The rods $l$ connecting the rake-head $h$ to the carriage, allow the rake-head to lift, and after lifting to turn and revolve, as stated, entirely clearing the carriage in its swing or turn.

By making the rake-head in sections, it is the more perfectly adapted to uneven ground surfaces.

Having thus described my invention, what I claim, and desire to secure by Letters Patent, is—

The rake-head $h$, suspended from the carriage A by the rods $l$, in combination with the rods $m$ connected to the rake-teeth, as shown, the crank-arms $o$, angular arm $s$, and lever $q$, all constructed and arranged to operate substantially as described.

WILLIAM WELLS.

Witnesses:
EDWIN W. BROWN,
J. P. McELROY.